United States Patent
Liu et al.

(10) Patent No.: US 12,361,746 B2
(45) Date of Patent: Jul. 15, 2025

(54) TEXTURE RECOGNITION PIXEL CIRCUIT, METHOD FOR DETECTING TEXTURE, TEXTURE DETECTION CIRCUIT, DISPLAY SUBSTRATE, AND DISPLAY APPARATUS

(71) Applicant: BOE TECHNOLOGY GROUP CO., LTD., Beijing (CN)

(72) Inventors: Yingming Liu, Beijing (CN); Xiaoliang Ding, Beijing (CN); Lei Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 349 days.

(21) Appl. No.: 17/911,333

(22) PCT Filed: Aug. 6, 2021

(86) PCT No.: PCT/CN2021/111077
§ 371 (c)(1),
(2) Date: Sep. 13, 2022

(87) PCT Pub. No.: WO2022/052699
PCT Pub. Date: Mar. 17, 2022

(65) Prior Publication Data
US 2023/0138319 A1 May 4, 2023

(30) Foreign Application Priority Data
Sep. 11, 2020 (CN) .......................... 202010955082.0

(51) Int. Cl.
*G06V 40/13* (2022.01)
*G06F 3/041* (2006.01)

(52) U.S. Cl.
CPC ........ *G06V 40/1318* (2022.01); *G06F 3/0412* (2013.01)

(58) Field of Classification Search
None
See application file for complete search history.

(56) References Cited

U.S. PATENT DOCUMENTS 11,475,700 B2 * 10/2022 Cheng ................. H04N 25/701
2016/0275887 A1 9/2016 Xiao
(Continued)

FOREIGN PATENT DOCUMENTS

| CN | 103928008 A | 7/2014 |
| CN | 104112120 A | 10/2014 |

(Continued)

OTHER PUBLICATIONS

The First Office Action mailed Feb. 14, 2025, in Chinese Application No. 202010955082.0, 31 pages including English translation.

*Primary Examiner* — Joseph R Haley
(74) *Attorney, Agent, or Firm* — XSENSUS LLP

(57) ABSTRACT

A texture recognition pixel circuit includes a photosensitive sub-circuit, a potential raising sub-circuit and a driving output sub-circuit. The photosensitive sub-circuit is configured to, under control of a first voltage transmitted by a first voltage terminal and a potential of the reading node, sense an optical signal including texture information, convert the optical signal into a first detection signal, and transmit the first detection signal to a reading node. The potential raising sub-circuit is configured to, due to an action of a second voltage signal transmitted by a second voltage signal terminal, raise the potential of the reading node. The driving output sub-circuit is configured to, due to an action of the first detection signal that is raised, a third voltage signal transmitted by a third voltage signal terminal and a fourth voltage signal transmitted by a fourth voltage signal terminal, generate and output a second detection signal.

18 Claims, 7 Drawing Sheets

(56) References Cited

U.S. PATENT DOCUMENTS

| | | | |
|---|---|---|---|
| 2018/0082100 A1* | 3/2018 | Hsieh | G06V 40/1318 |
| 2018/0101714 A1 | 4/2018 | Lin et al. | |
| 2018/0314873 A1 | 11/2018 | Yang et al. | |
| 2019/0056613 A1 | 2/2019 | Wang et al. | |
| 2019/0222781 A1* | 7/2019 | Lim | H04N 25/618 |
| 2020/0176493 A1* | 6/2020 | Ikeda | H04N 25/673 |
| 2021/0056282 A1* | 2/2021 | Kim | G09G 3/32 |

FOREIGN PATENT DOCUMENTS

| | | |
|---|---|---|
| CN | 105981040 A | 9/2016 |
| CN | 106773219 A | 5/2017 |
| CN | 107643854 A | 1/2018 |
| CN | 108062540 A | 5/2018 |
| CN | 109031823 A | 12/2018 |
| CN | 111368805 A | 7/2020 |
| IN | 110825171 A | 2/2020 |

* cited by examiner

TEXTURE RECOGNITION PIXEL CIRCUIT, METHOD FOR DETECTING TEXTURE, TEXTURE DETECTION CIRCUIT, DISPLAY SUBSTRATE, AND DISPLAY APPARATUS

CROSS-REFERENCE TO RELATED APPLICATIONS

This application is a national phase entry under 35 USC 371 of International Patent Application No. PCT/CN2021/111077 filed on Aug. 6, 2021, which claims priority to Chinese Patent Application No. 202010955082.0, filed on Sep. 11, 2020, which are incorporated herein by reference in their entirety.

TECHNICAL FIELD

The present disclosure relates to the field of display technologies, and in particular, to a texture recognition pixel circuit, a method for detecting a texture, a texture detection circuit, a display substrate and a display apparatus.

BACKGROUND

With the development of science and technology, texture sensing technologies (e.g., fingerprint sensing technologies) are more and more widely used in daily life.

According to principles of fingerprint imaging, the fingerprint sensing technologies may be classified into an optical fingerprint sensing technology, a semiconductor capacitive fingerprint sensing technology, a semiconductor thermosensitive fingerprint sensing technology, a semiconductor pressure sensitive fingerprint sensing technology, an ultrasonic fingerprint sensing technology, etc. The optical fingerprint sensing technology is a technology in which, after light is incident on a fingerprint (e.g., the fingerprint of a finger), a texture of the fingerprint is mainly obtained by acquiring signals of reflected light (i.e., the light reflected by the finger) through an image sensor.

SUMMARY

In one aspect, a texture recognition pixel circuit is provided. The texture recognition pixel circuit includes a photosensitive sub-circuit, a potential raising sub-circuit and a driving output sub-circuit. The photosensitive sub-circuit is electrically connected to a first voltage signal terminal and a reading node. The photosensitive sub-circuit is configured to, under control of a first voltage transmitted by the first voltage terminal and a potential of the reading node, sense an optical signal including texture information, convert the optical signal into a first detection signal and transmit the first detection signal to the reading node. The potential raising sub-circuit is electrically connected to a second voltage signal terminal and the reading node. The potential raising sub-circuit is configured to, due to an action of a second voltage signal transmitted by the second voltage signal terminal, raise the potential of the reading node. The driving output sub-circuit is electrically connected to a third voltage signal terminal, a fourth voltage signal terminal and the reading node. The driving output sub-circuit is configured to, due to an action of the raised first detection signal, a third voltage signal transmitted by the third voltage signal terminal and a fourth voltage signal transmitted by the fourth voltage signal terminal, generate and output a second detection signal.

In some embodiments, the potential raising sub-circuit includes a first transistor. A control electrode of the first transistor is electrically connected to the reading node, and a first electrode and a second electrode of the first transistor are both electrically connected to the second voltage signal terminal.

In some embodiments, the potential raising sub-circuit includes a first storage capacitor. A first plate of the first storage capacitor is electrically connected to the reading node, and a second plate of the first storage capacitor is electrically connected to the second voltage signal terminal.

In some embodiments, the photosensitive sub-circuit includes a photoelectric detector. A first terminal of the photoelectric detector is electrically connected to the first voltage signal terminal, and a second terminal of the photoelectric detector is electrically connected to the reading node. The driving output sub-circuit includes a second transistor and a third transistor. A control electrode of the second transistor is electrically connected to the reading node, a first electrode of the second transistor is electrically connected to the third voltage signal terminal, and a second electrode of the second transistor is electrically connected to a first electrode of the third transistor. A control electrode of the third transistor is electrically connected to the fourth voltage signal terminal, and a second electrode of the third transistor is configured to output the second detection signal.

In some embodiments, the second voltage signal terminal and the fourth voltage signal terminal are a same voltage signal terminal.

In some embodiments, the texture recognition pixel circuit further includes: a reset sub-circuit. The reset sub-circuit is electrically connected to a fifth voltage signal terminal, a scanning signal terminal and the reading node. The reset sub-circuit is configured to, under control of a scanning signal transmitted by the scanning signal terminal, transmit a fifth voltage signal transmitted by the fifth voltage signal terminal to the reading node, so as to reset the reading node.

In some embodiments, the reset sub-circuit includes a fourth transistor. A control electrode of the fourth transistor is electrically connected to the scanning signal terminal, a first electrode of the fourth transistor is electrically connected to the fifth voltage signal terminal, and a second electrode of the fourth transistor is electrically connected to the reading node.

In some embodiments, the texture recognition pixel circuit further includes: a second storage capacitor. A first plate of the second storage capacitor is electrically connected to a sixth voltage signal terminal, and a second plate of the second storage capacitor is electrically connected to the reading node. A signal transmitted by the sixth voltage signal terminal is different from the first detection signal on the reading node. The second storage capacitor is configured to store the first detection signal transmitted to the reading node.

In some embodiments, the texture recognition pixel circuit further includes a second storage capacitor. A first plate of the second storage capacitor is electrically connected to a sixth voltage signal terminal, and a second plate of the second storage capacitor is electrically connected to the reading node. The photosensitive sub-circuit includes a photoelectric detector; the potential raising sub-circuit includes a first transistor, the driving output sub-circuit includes a second transistor and a third transistor; and the reset sub-circuit includes a fourth transistor. A first terminal of the photoelectric detector is electrically connected to the first voltage signal terminal, and a second terminal of the photoelectric detector is electrically connected to the reading node. A control electrode of the first transistor is electrically connected to the reading node, and a first electrode and a second electrode of the first transistor are both electrically connected to the second voltage signal terminal. A control electrode of the second transistor is electrically connected to the reading node, and a first electrode of the second transistor is electrically connected to the third voltage signal terminal, and a second electrode of the second transistor is electrically connected to a first electrode of the third transistor. A control electrode of the third transistor is electrically connected to the fourth voltage signal terminal, and a second electrode of the third transistor is configured to output the second detection signal. A control electrode of the fourth transistor is electrically connected to the scanning signal terminal, a first electrode of the fourth transistor is electrically connected to the fifth voltage signal terminal, and a second electrode of the fourth transistor is electrically connected to the reading node.

In some embodiments, the texture recognition pixel circuit further includes a second storage capacitor. A first plate of the second storage capacitor is electrically connected to a sixth voltage signal terminal, and a second plate of the second storage capacitor is electrically connected to the reading node. The photosensitive sub-circuit includes a photoelectric detector; the potential raising sub-circuit includes a first storage capacitor; the driving output sub-circuit includes a second transistor and a third transistor; and the reset sub-circuit includes a fourth transistor. A first terminal of the photoelectric detector is electrically connected to the first voltage signal terminal, and a second terminal of the photoelectric detector is electrically connected to the reading node. A first plate of the first storage capacitor is electrically connected to the reading node, and a second plate of the first storage capacitor is electrically connected to the second voltage signal terminal. A control electrode of the second transistor is electrically connected to the reading node, and a first electrode of the second transistor is electrically connected to the third voltage signal terminal, and a second electrode of the second transistor is electrically connected to a first electrode of the third transistor. A control electrode of the third transistor is electrically connected to the fourth voltage signal terminal, and a second electrode of the third transistor is configured to output the second detection signal. A control electrode of the fourth transistor is electrically connected to the scanning signal terminal, a first electrode of the fourth transistor is electrically connected to the fifth voltage signal terminal, and a second electrode of the fourth transistor is electrically connected to the reading node.

In another aspect, a method for detecting a texture is provided. The method is applied to the texture recognition pixel circuit as described in any one of the above embodiments. A driving cycle of the method includes an exposure stage and an output stage. The method includes: in the exposure stage: sensing, by the photosensitive sub-circuit of the texture recognition pixel circuit, the optical signal including the texture information; converting, by the photosensitive sub-circuit of the texture recognition pixel circuit under the control of the first voltage transmitted by the first voltage terminal and the potential of the reading node, the optical signal into the first detection signal; and transmitting, by the photosensitive sub-circuit of the texture recognition pixel circuit, the first detection signal to the reading node. In the output stage: raising, by the potential raising sub-circuit of the texture recognition pixel circuit, the potential of the reading node due to the action of the second voltage signal transmitted by the second voltage signal terminal; and generating, by the driving output sub-circuit of the texture recognition circuit, the second detection signal under the control of the raised first detection signal, the third voltage signal transmitted by the third voltage signal terminal and the fourth voltage signal transmitted by the fourth voltage signal terminal, and outputting, by the driving output sub-circuit, the second detection signal.

In some embodiments, the texture recognition pixel circuit further includes a reset sub-circuit. The reset sub-circuit is electrically connected to a fifth voltage signal terminal, a scanning signal terminal and the reading node. The driving cycle further includes a reset stage. The method further includes: in the reset stage: transmitting, by the reset sub-circuit of the texture recognition pixel circuit, a fifth voltage signal transmitted by the fifth voltage signal terminal to the reading node under control of a scanning signal transmitted by the scanning signal terminal, so as to reset the reading node.

In yet another aspect, a texture detection circuit is provided. The texture detection circuit includes: a plurality of texture recognition pixel circuits each as described in any one of the above embodiments and a plurality of amplification sub-circuits. An amplification sub-circuit of the plurality of amplification sub-circuits is electrically connected with a driving output sub-circuit of at least one texture recognition pixel circuit of the plurality of texture recognition pixel circuits. The amplification sub-circuit is configured to amplify a second detection signal output by the driving output sub-circuit.

In some embodiments, the plurality of amplification sub-circuits are electrically connected to the plurality of texture recognition pixel circuits in one-to-one correspondence.

In some embodiments, the amplification sub-circuit includes: a negative feedback amplification circuit, a third storage capacitor and a switch. A non-inverting input terminal of the negative feedback amplification circuit is electrically connected to a seventh voltage signal terminal, an inverting input terminal of the negative feedback amplification circuit connected to the driving output sub-circuit, a first plate of the third storage capacitor and a first end of the switch, and an output terminal of the negative feedback amplification circuit is electrically connected to a second plate of the third storage capacitor and a second end of the switch.

In some embodiments, the plurality of texture recognition pixel circuits are arranged in a plurality of columns. A column of texture recognition pixel circuits includes at least one texture recognition pixel circuit. An amplification sub-circuit is electrically connected to each texture recognition pixel circuit in the column of texture recognition pixel circuits.

In yet another aspect, a display substrate is provided. The display substrate has a display region and a non-display region outside the display region. The display region includes a texture recognition region. The display substrate includes: a substrate and the texture detection circuit disposed on a side of the substrate according to any one of the above embodiments. The plurality of texture recognition pixel circuits of the texture detection circuit are located in the texture recognition region, and the plurality of amplification sub-circuits of the texture detection circuit are located in the non-display region.

In yet another aspect, a display apparatus is provided. The display apparatus includes the display substrate as described in any one of the above embodiments.

In some embodiments, the display apparatus further includes: a texture recognition chip electrically connected to the plurality of amplification sub-circuits of the texture detection circuit of the display substrate. The texture recognition chip is configured to receive amplified second detection signals output by the plurality of amplification sub-circuits, and determine a texture to be recognized according to the amplified second detection signals.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person having ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Figure 1:
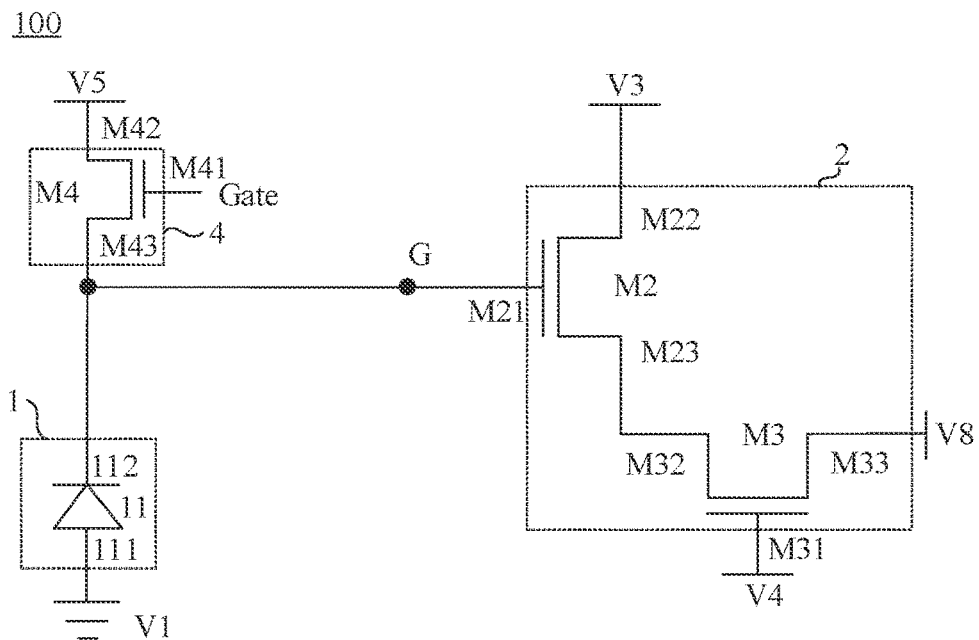
FIG. 1 is a circuit diagram of a texture recognition pixel circuit, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. The embodiments disclosed herein are not necessarily limited to the content herein.

As used herein, the term "if" is optionally construed as "when" or "in a case where" or "in response to determining that" or "in response to detecting" depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" as used herein indicates an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Terms such as "about", or "approximately" as used herein include a stated value and an average value within an acceptable range of deviation of a particular value. The acceptable range of deviation is determined by a person of ordinary skill in the art in view 1I of the measurement in question and the error associated with the measurement of a particular quantity (i.e., the limitations of the measurement system).

Exemplary embodiments are described herein with reference to sectional views and/or plan views as idealized exemplary drawings. In the accompanying drawings, thicknesses of layers and areas of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of the region in an apparatus, and are not intended to limit the scope of the exemplary embodiments.

Image sensors mainly include passive pixel sensors (PPSs) and active pixel sensors (APSs).

The following description is a schematic illustration by taking an example where the above mentioned texture sensing technology is a fingerprint sensing technology and the image sensor is an APS.

Some embodiments of the present disclosure provide a texture recognition pixel circuit 100. The texture recognition pixel circuit 100 may be an active texture recognition pixel circuit. As shown in FIG. 1 and FIGS. 3 to 6, the texture recognition pixel circuit 100 includes: a photosensitive sub-circuit 1 and a driving output sub-circuit 2.

In some embodiments, as shown in FIG. 1 and FIGS. 3 to 6, the photosensitive sub-circuit 1 is electrically connected to a first voltage signal terminal V1 and a reading node G. The first voltage signal terminal V1 is configured to receive a first voltage signal and input the first voltage signal to the photosensitive sub-circuit 1.

In some examples, the photosensitive sub-circuit 1 is configured to sense an optical signal including texture information, convert the optical signal into a first detection signal and transmit the first detection signal to the reading node G.

For example, the optical signal including the texture information may be a signal of reflected light (i.e., light reflected by a finger) after light is incident on a fingerprint of the finger. The fingerprint has ridges and valleys, such that optical signals including texture information may include ridge reflection light (i.e., light reflected by the ridges in the fingerprint after light is incident on the ridges in the fingerprint) and valley reflection light (i.e., light reflected by the valleys in the fingerprint after the light is incident on the valleys in the fingerprint). Light intensities of the ridge reflection light and the valley reflection light are different.

For example, the photosensitive sub-circuit 1 can perform photoelectric conversion. That is, after sensing the optical signal, the photosensitive sub-circuit 1 can convert the optical signal into an electrical signal (i.e., the first detection signal) and transmit the first detection signal to the reading node G. After the first detection signal is transmitted to the reading node G, a potential of the reading node G will drop.

When light intensities of optical signals sensed by the photosensitive sub-circuit 1 are different, magnitudes of electrical signals obtained by conversion are different. Therefore, a drop in the potential of the reading node G in a case where the optical signal sensed by the photosensitive sub-circuit 1 is the ridge reflection light is different from a drop in the potential of the reading node G in a case where the optical signal sensed by the photosensitive sub-circuit 1 is the valley reflection light. For example, in the case where the optical signal sensed by the photosensitive sub-circuit 1 is the ridge reflection light, the potential of the reading node G may drop by 0.5V; and in the case where the optical signal sensed by the photosensitive sub-circuit 1 is the valley reflection light, the potential of the reading node G may drop by 1V.

A structure of the photosensitive sub-circuit 1 may vary, which is determined according to actual needs.

In some examples, as shown in FIG. 1, the photosensitive sub-circuit 1 includes a photoelectric detector 11. A first terminal 111 of the photoelectric detector 11 is electrically connected to the first voltage signal terminal V1, and a second terminal 112 of the photoelectric detector 11 is electrically connected to the reading node G.

For example, the first terminal 111 of the photoelectric detector 11 may be a positive electrode, and the second terminal 112 of the photoelectric detector 11 may be a negative electrode. A difference between a voltage of the first voltage signal and the potential of the reading node G is negative (that is, the voltage of the first voltage signal is less than the potential of the reading node G), so that the photoelectric detector 11 is in a reverse bias state. Thus, in a case where the optical signal does not enter the photosensitive sub-circuit 1, the photoelectric detector 11 may be in a turned off state; and in a case where the optical signal enters the photosensitive sub-circuit 1, the photoelectric detector 11 may be in a turned on state, so as to convert the optical signal into the first detection signal and transmit the first detection signal to the reading node G.

Here, for example, the difference between the first voltage signal and the potential of the reading node G may be in a range of 2 V to 7 V, inclusive.

Figure 4:
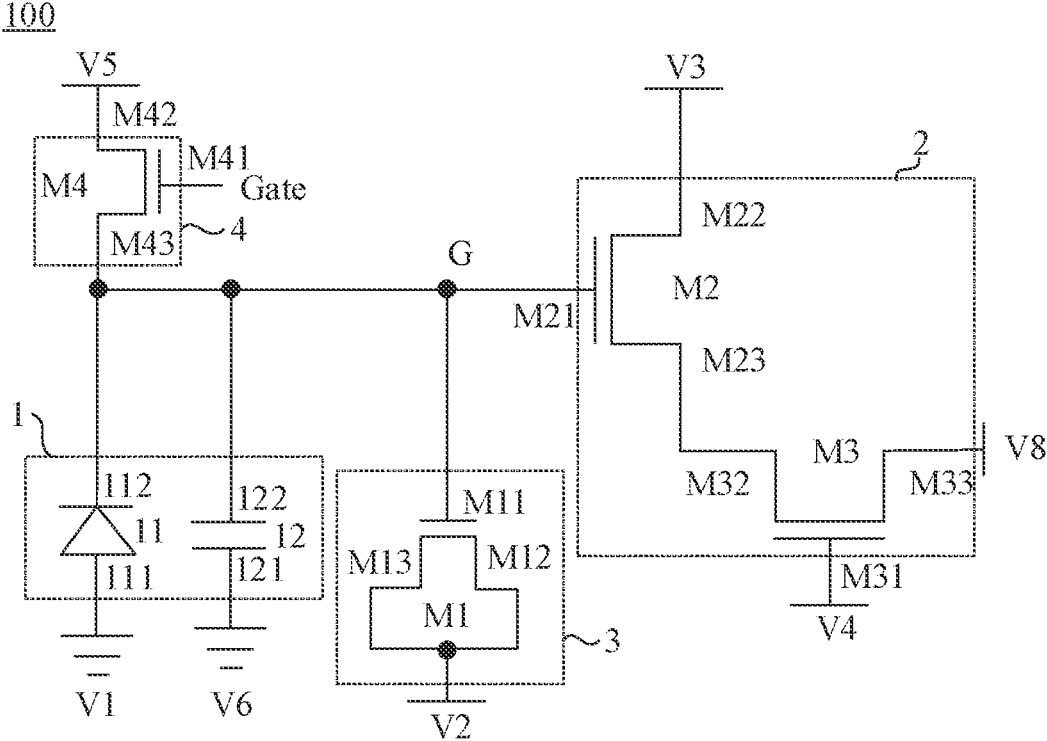
FIG. 4 is a circuit diagram of yet another texture recognition pixel circuit, in accordance with some embodiments of the present disclosure.

In some other examples, as shown in FIG. 4, the texture recognition pixel circuit 100 further includes: a second storage capacitor 12. The photosensitive sub-circuit 1 may include the second storage capacitor 12 in addition to the photoelectric detector 11.

For example, as shown in FIG. 4, a first plate 121 of the second storage capacitor 12 may be electrically connected to a sixth voltage signal terminal V6, and a second plate 122 of the second storage capacitor 12 may be electrically connected to the reading node G. The sixth voltage signal terminal V6 is configured to receive a sixth voltage signal, and input the sixth voltage signal to the first plate 121 of the second storage capacitor 12.

The second storage capacitor 12 is configured to store the first detection signal transmitted to the reading node G. That is, in a case where the driving output sub-circuit 2 electrically connected to the reading node G is inactive, the second storage capacitor 12 may store the first detection signal obtained after conversion by the photoelectric detector 11. Then, in a case where the driving output sub-circuit 2 needs to work, the second storage capacitor 12 may output the stored first detection signal.

It will be noted that the photoelectric detector 11 may be capable of storing charges. This means that, in a case where the photosensitive sub-circuit 1 does not include the second storage capacitor 12, the photoelectric detector 11 may also store the first detection signal that is obtained after conversion by itself in the case where the driving output sub-circuit 2 is inactive, and output the first detection signal stored in itself in the case where the driving output sub-circuit 2 needs to work.

A structure of the photoelectric detector 11 may vary. For example, the photoelectric detector 11 may be a photodiode.

In some embodiments, as shown in FIG. 1 and FIGS. 3 to 6, the driving output sub-circuit 2 is electrically connected to a third voltage signal terminal V3, a fourth voltage signal terminal V4 and the reading node G. The third voltage signal terminal V3 is configured to receive a third voltage signal and input the third voltage signal to the driving output sub-circuit 2. The fourth voltage signal terminal V4 is configured to receive a fourth voltage signal and input the fourth voltage signal to the driving output sub-circuit 2.

Here, the reading node G is a connection point between the photosensitive sub-circuit 1 and the driving output sub-circuit 2, rather than an actual component.

In some examples, the driving output sub-circuit 2 is configured to under control of the first detection signal and the fourth voltage signal transmitted by the fourth voltage signal terminal V4, generate and output a second detection signal.

In some examples, as shown in FIG. 1 and FIGS. 3 to 6, a structure of the driving output sub-circuit 2 may be that, the driving output sub-circuit 2 includes a second transistor M2 and a third transistor M3. A control electrode M21 of the second transistor M2 (i.e., a gate of the second transistor M2) is electrically connected to the reading node G, and a first electrode M22 of the second transistor M2 (i.e., one of a source and a drain of the second transistor M2) is electrically connected to the third voltage signal terminal V3, and a second electrode M23 of the second transistor M2 (i.e., the other of the source and drain of the second transistor M2) is electrically connected to a first electrode M32 of the third transistor M3 (i.e., one of a source and a drain of the third transistor M3). A control electrode M31 of the third transistor M3 (i.e., a gate of the third transistor M3) is connected to the fourth voltage signal terminal V4, and a second electrode M33 of the third transistor M3 (i.e., the other of the source and the drain of the third transistor M3) is configured to output the second detection signal.

For example, the second transistor M2 is configured to be turned on under control of the first detection signal, so that the second transistor M2 is in a linear conduction state, and generates the second detection signal due to an action of the third voltage signal. The third transistor M3 is configured to be turned on under control of the fourth voltage signal, so that the third transistor M3 is in a saturated conduction state, and outputs the second detection signal.

For example, the second electrode M33 of the third transistor M3 is electrically connected to an eighth voltage signal terminal V8 (being equivalent to an inverting input terminal 52 in following embodiments). The eighth voltage signal terminal V8 is configured to receive an eighth voltage signal and provide the eighth voltage signal to the second electrode M33 of the third transistor M3. In this way, in a case where the third transistor M3 is in the saturated conduction state under the control of the fourth voltage signal, the eighth voltage signal may be provided to the second electrode M23 of the second transistor M2.

In some examples, the third voltage signal may be a direct current (DC) high level signal, and the eighth voltage signal may be a DC low level signal. Here, the "high" and "low" are only in terms of comparing the third voltage signal with the eighth voltage signal, which may mean that a value of a voltage of the third voltage signal is greater than a value of a voltage of the eighth voltage signal.

In this case, in a case where the second transistor M2 and the third transistor M3 are turned on, a difference between a potential of the first electrode M22 of the second transistor M2 and a potential of the second electrode M23 of the second transistor M2 may be a fixed value. In this way, the characteristics of the second transistor M2 may be controlled by a potential of the control electrode M21 of the second transistor M2 (i.e., the potential of the reading node G), so that a current (i.e., the second detection signal) output by the second electrode M23 of the second transistor M2 may change correspondingly as the potential of the reading node G changes.

The difference in the optical signals sensed by the photosensitive sub-circuit 1 will cause the difference in the drop in the potential of the reading node G, so that a second detection signal output by the driving output sub-circuit 2 in the case where the optical signal is the ridge reflection light is different from a second detection signal output by the driving output sub-circuit 2 in the case where the optical signal is the valley reflection light. After a plurality of second detection signals are obtained, an analysis may be performed on the plurality of second detection signals to determine portion (i.e., ridges or valleys) corresponding to the plurality of second detection signals in the fingerprint, thereby realizing recognition of a texture of the fingerprint.

In some of the embodiments, the potential of the control electrode M21 of the second transistor M2 is relatively low, and a potential difference between the control electrode M21 of the second transistor M2 and the second electrode M33 of the second transistor M2 is relatively small.

Figure 2:
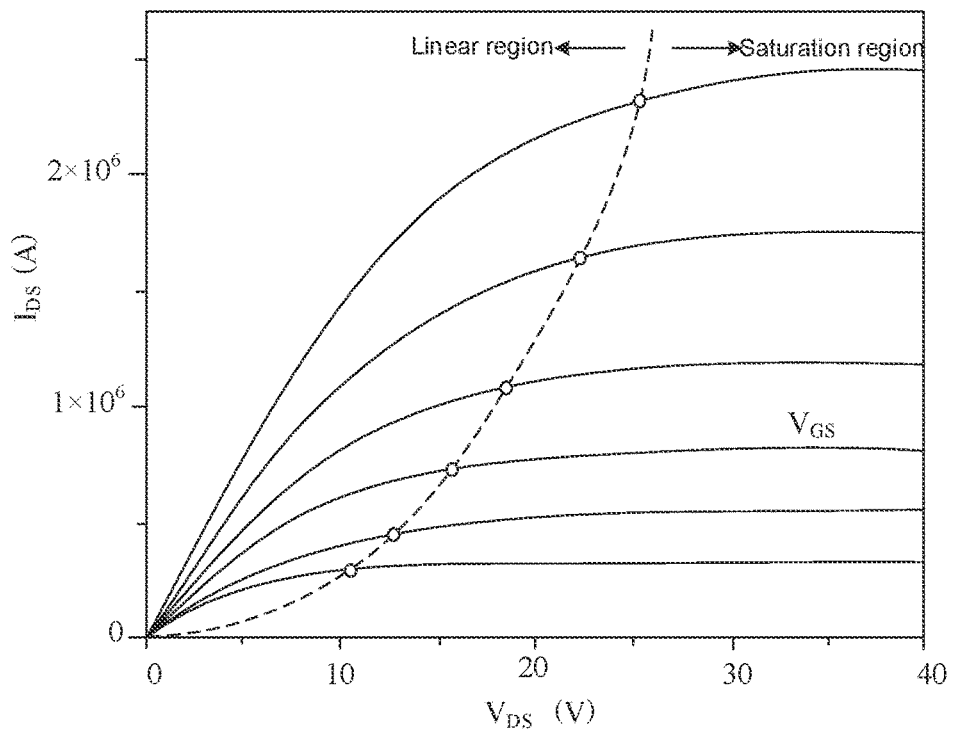
FIG. 2 is a schematic diagram of an output characteristic curve of a transistor, in accordance with some embodiments of the present disclosure.

FIG. 2 is a schematic diagram of an output characteristic curve of a transistor. The second transistor M2 is in the linear conduction state. In this case, output characteristics of the second transistor M2 may refer to a linear region shown in FIG. 2. In a case where the difference between the potential of the first electrode M22 of the second transistor M2 and the potential of the second electrode M23 of the second transistor M2 is a fixed value, since the potential of the control electrode M21 of the second transistor M2 is relatively low, the difference between the control electrode M21 of the second transistor M2 and the second electrode M23 of the second transistor M2 is relatively small, and the difference between the drop in the potential of the reading node G in the case where the ridge reflection light is sensed by the photosensitive sub-circuit 1 and the drop in the potential of the reading node G in the case where the valley reflection light is sensed by the photosensitive sub-circuit 1 is relatively small (that is, the potential of the control electrode M21 of the second transistor M2 changes slightly). Consequently, a difference between the second detection signal output by the second electrode M23 of the second transistor M2 in the case where the optical signal is the ridge reflection light and the second detection signal output by the second electrode M23 of the second transistor M2 in the case where the optical signal is the valley reflection light is small, which increases a difficulty of recognizing and analyzing the second detection signals and reduces an accuracy of texture recognition.

In light of this, in some embodiments, as shown in FIGS. 3 to 6, the texture recognition pixel circuit 100 further includes: a potential raising sub-circuit 3.

In some examples, as shown in FIGS. 3 to 6, the potential raising sub-circuit 3 is electrically connected to a second voltage signal terminal V2 and the reading node G. The second voltage signal terminal V2 is configured to receive a second voltage signal and input the second voltage signal to the potential raising sub-circuit 3.

In some examples, the potential raising sub-circuit 3 is configured to raise the potential of the reading node G due to an action of the second voltage signal transmitted by the second voltage signal terminal V2.

Here, the "raising the potential of the reading node G" refers to adding a certain potential to an original potential of the reading node G. For example, after the first detection signal is transmitted to the reading node G, the potential of the reading node G may be 1V. On this basis, the potential raising sub-circuit 3 may raise the potential of the reading node G by 5V. In this case, the potential of the reading node G (i.e., a raised potential of the first detection signal) may be 6V.

In the case where the difference between the potential of the first electrode M22 of the second transistor M2 and the potential of the second electrode M23 of the second transistor M2 is a fixed value, by raising the potential of the reading node G (i.e., raising the potential of the control electrode M21 of the second transistor M2), it may be possible to increase the difference between the potential of the first electrode M22 of the second transistor M2 and the potential of the second electrode M23 of the second transistor M2. In this way, even if the difference between the drop in the potential of the reading node G in the case where the ridge reflection light is sensed by the photosensitive sub-circuit 1 and the drop in the potential of the reading node G in the case where the valley reflection light is sensed by the photosensitive sub-circuit 1 is small, the difference between the second detection signal output by the second electrode M23 of the second transistor M2 in the case where the optical signal is the ridge reflection light and the second detection signal output by the second electrode M23 of the second transistor M2 in the case where the optical signal is the valley reflection light is enabled to be relatively great. Therefore, it is conductive to reducing the difficulty of recognizing and analyzing the second detection signals and improving the accuracy of texture recognition.

Therefore, in the texture recognition pixel circuit 100 provided in some embodiments of the present disclosure, by connecting the potential raising sub-circuit 3 to the connection point (i.e., the reading node G) between the photosensitive sub-circuit 1 and the driving output sub-circuit 2, it may be possible to use the potential raising sub-circuit 3 to raise the potential of the reading node G (i.e., a value of a static working point of the photosensitive sub-circuit 1) after the photosensitive sub-circuit 1 senses the optical signal including the texture information and converts the optical signal into the first detection signal, which may effectively increase the potential difference between the reading node G and an output terminal (i.e., the second electrode M33 of the third transistor M3) of the driving output sub-circuit 2, and then effectively increase the difference between the second detection signal output by the driving output sub-circuit 2 in the case where the optical signal is the ridge reflection light and the second detection signal output by the driving output sub-circuit 2 in the case where the optical signal is the valley reflection light. Therefore, it is conductive to reducing the difficulty of recognizing and analyzing the second detection signals and improving the accuracy of texture recognition.

In addition, by connecting the potential raising sub-circuit 3 to the reading node G, it may be possible to keep the potential of the reading node G at a relatively low potential in a case where the first detection signal has not been read. In this way, an occurrence of electric leakage in the texture recognition pixel circuit 100 may be avoided.

In some embodiments, a structure of the potential raising sub-circuit 3 may vary, which is determined according to actual needs.

Figure 3:
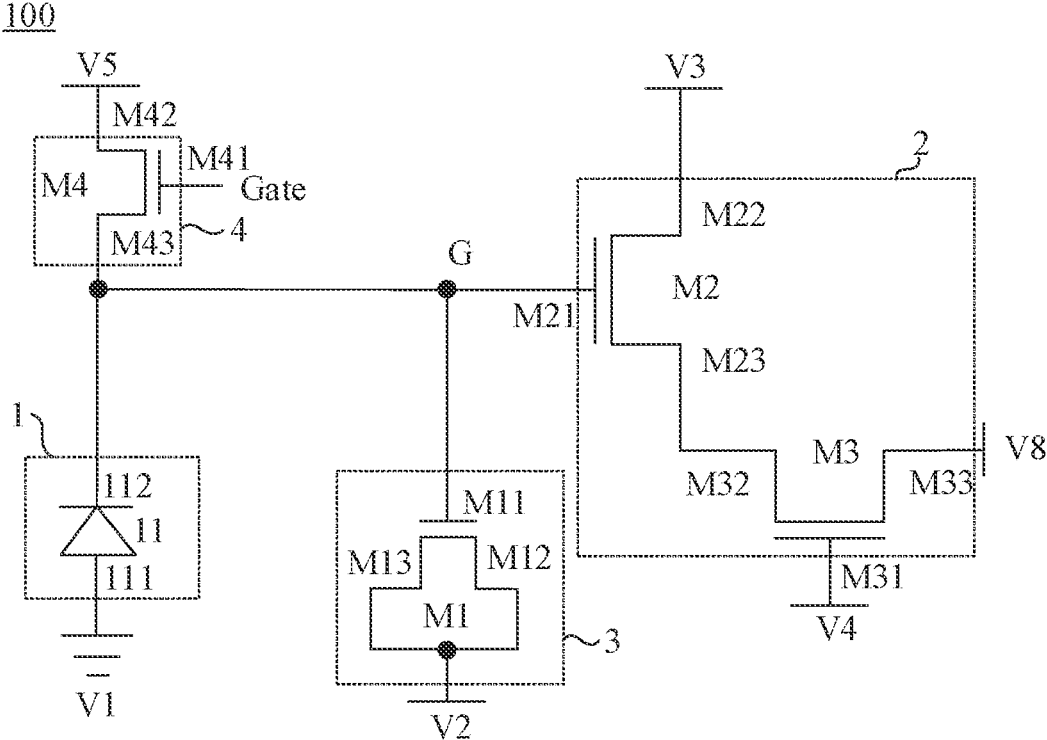
FIG. 3 is a circuit diagram of another texture recognition pixel circuit, in accordance with some embodiments of the present disclosure.
Figure 5:
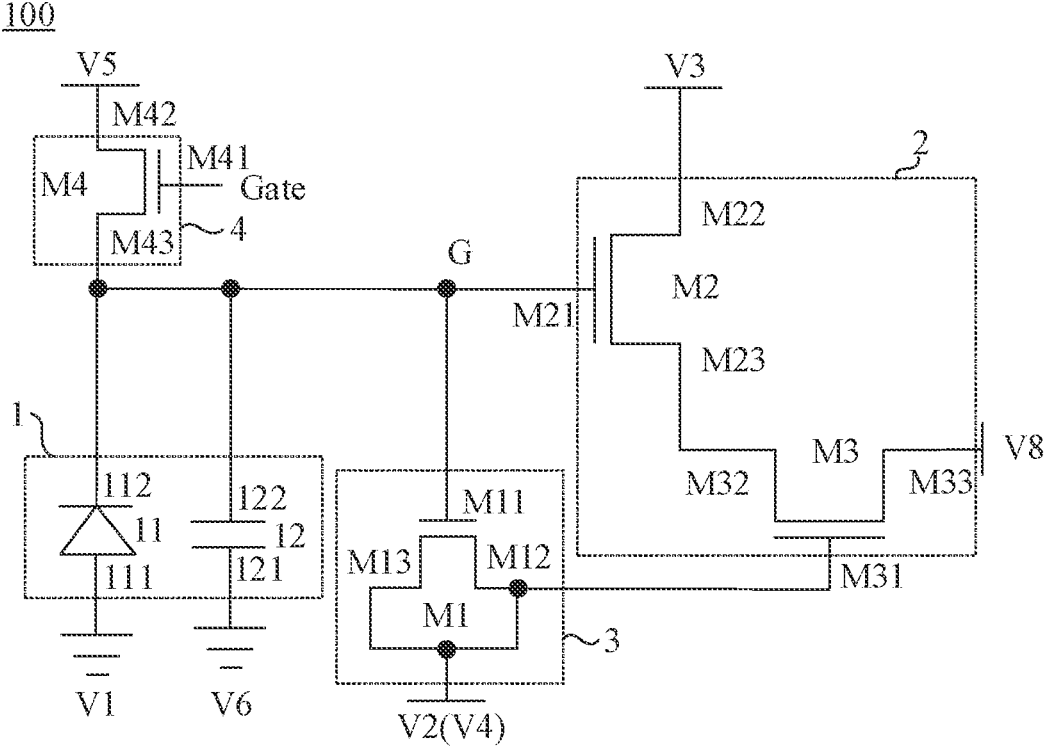
FIG. 5 is a circuit diagram of yet another texture recognition pixel circuit, in accordance with some embodiments of the present disclosure.

In some embodiments, as shown in FIGS. 3 to 5, the potential raising sub-circuit 3 includes a first transistor M1. A control electrode M11 of the first transistor M1 (i.e., a gate of the first transistor M1) is electrically connected to the reading node G, and a first electrode M12 (i.e., one of a source and a drain) and a second electrode M13 (i.e., the other of the source and the drain) of the first transistor M1 are both electrically connected to the second voltage signal terminal V2.

If the first electrode M12 and the second electrode M13 of the first transistor M1 are not electrically connected to a same voltage signal terminal, the first electrode M12 and the second electrode M13 of the first transistor M1 are insulated from each other. Here, the first electrode M12 and the second electrode M13 of the first transistor M1 being both electrically connected to the second voltage signal terminal V means that, the first electrode M12 and the second electrode M13 of the first transistor M1 are electrically connected to each other.

Since the control electrode M11 of the first transistor M1 and the first electrode M12 of the first transistor M1 are insulated from each other, the control electrode M11 of the first transistor M1 and the second electrode M13 of the first transistor M1 are insulated from each other, and the first electrode M12 and the second electrode M13 of the transistor M1 are electrically connected to each other, the first electrode M12 and the second electrode M13 of the first transistor M1 and the control electrode M11 of the first transistor M1 may form a structure similar to a storage capacitor.

In a case where the second voltage signal is input to the first electrode M12 and the second electrode M13 of the first transistor M1, due to the coupling principle of the storage capacitor, the potential of the control electrode M11 of the first transistor M1 will change due to an action of the second voltage signal. In this way, by setting a value of the second voltage signal input to the first electrode M12 and the second electrode M13 of the first transistor M1, the potential of the control electrode M11 of the first transistor M1 may be raised. That is, the potential of the reading node G may be raised.

In these examples, since the potential raising sub-circuit 3 adopts such a structure, the first transistor M1 may be formed synchronously during a process of forming the second transistor M2 and the third transistor M3. Therefore, it may be possible to avoid additional steps in a process for forming the texture recognition circuit 100 under a premise of effectively increasing the difference between the second detection signal corresponding to the ridge reflection light and the second detection signal corresponding to the valley reflection light.

Figure 6:
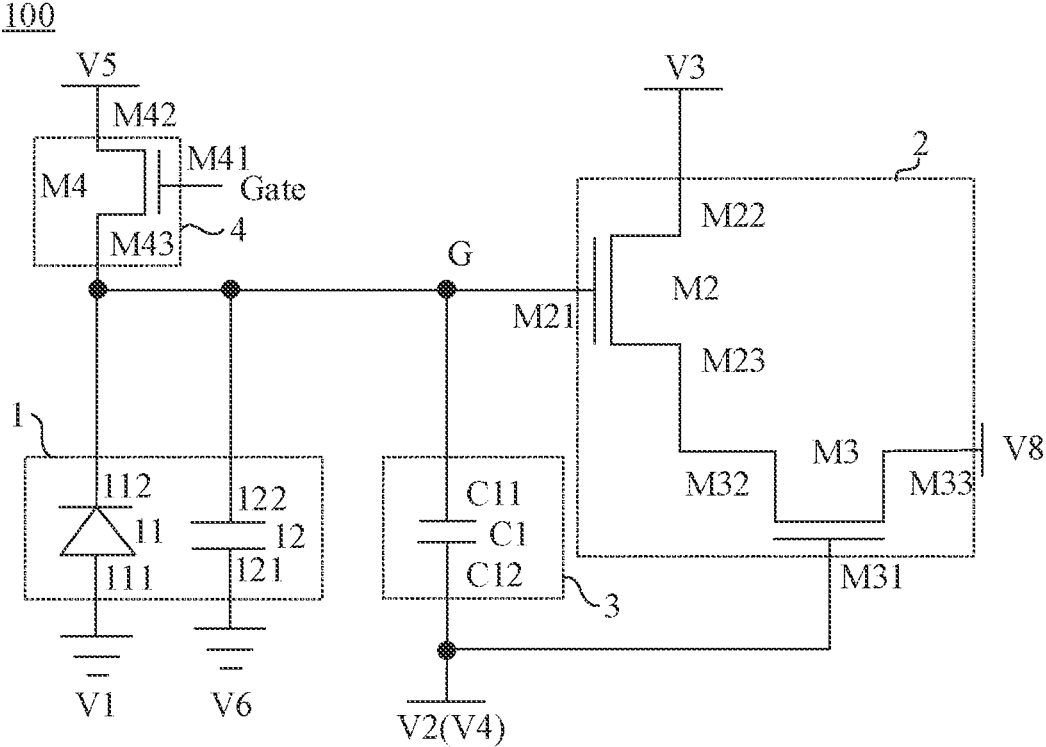
FIG. 6 is a circuit diagram of yet another texture recognition pixel circuit, in accordance with some embodiments of the present disclosure.

In some other examples, as shown in FIG. 6, the potential raising sub-circuit 3 includes a first storage capacitor C1. A first plate C11 of the first storage capacitor C1 is electrically connected to the reading node G, and a second plate C12 of the first storage capacitor C1 is electrically connected to the second voltage signal terminal V2.

Here, according to the coupling principle of the first storage capacitor C1, in a case where a potential of the second plate C12 of the first storage capacitor C1 changes (e.g., the potential rises), a potential of the first plate C11 of the first storage capacitor C1 changes (e.g., the potential rises) accordingly. In this way, by inputting the second voltage signal to the second plate C12 of the first storage capacitor C1 and setting a reasonable value of the second voltage signal, the potential of the first plate C11 of the first storage capacitor C1 may be raised, which means that the potential of the reading node G may be raised.

In these examples, since the potential raising sub-circuit 3 adopts such a structure, the first plate C11 of the first storage capacitor C1 may be arranged in a same layer as the control electrode M11 of the first transistor M1 and the control electrode M2 of the second transistor M2, and the second electrode plate C12 of the first storage capacitor C1 may be arranged in a same layer as the first electrode M12 and the second electrode M13 of the first transistor M1 and the first electrode M22 and the second electrode M23 of the second transistor M2. In this way, it may be possible to avoid additional steps in the process for forming the texture recognition circuit 100 under the premise of effectively increasing the difference between the second detection signal corresponding to the ridge reflection light and the second detection signal corresponding to the valley reflection light.

It will be noted that, the "same layer" mentioned herein refers to a layer structure formed by forming a film layer for forming specific patterns through a same film forming process and then performing a single patterning process using a same mask. Depending on different specific patterns, the patterning process may include a plurality of exposure processes, development processes or etching processes, the specific patterns in the formed layer structure may be continuous or discontinuous, and these specific patterns may also be at different heights or have different thicknesses. In this way, the first electrode plate C11 of the first storage capacitor C1, the gate electrode M11 of the first transistor M1 and the gate electrode M2 of the second transistor M2 may be simultaneously formed in a single patterning process, and the second electrode plate C12 of the first storage capacitor C1, the first electrode M12 and the second electrode M13 of the first transistor M1 and the first electrode M22 and the second electrode M23 of the second transistor M2 are simultaneously formed in another single patterning process, which is conductive to simplifying the process of forming the texture recognition pixel circuit 100.

In some embodiments, a manner in which the second voltage signal terminal V2 and the fourth voltage signal terminal V4 are set may vary, which is determined according to actual needs.

In some examples, as shown in FIGS. 3 and 4, the second voltage signal terminal V2 and the fourth voltage signal terminal V4 are different voltage signal terminals.

In this case, the second voltage signal received by the second voltage signal terminal V2 and the fourth voltage signal received by the fourth voltage signal terminal V4 may be same or different, so long as the potential of the reading node G may be raised due to the action of the second voltage signal, and the third transistor M3 may be in a saturated conduction state under the control of the fourth voltage signal.

By setting the second voltage signal terminal V2 and the fourth voltage signal terminal V4 to be different voltage signal terminals, it may be conductive to respectively controlling the potential of the reading node G and a conduction state of the third transistor M3.

In some other examples, as shown in FIGS. 5 and 6, the second voltage signal terminal V2 and the fourth voltage signal terminal V4 are a same voltage signal terminal.

For example, the second voltage signal terminal V2 and the fourth voltage signal terminal V4 are collectively referred to as the second voltage signal terminal V2. In this way, after the second voltage signal terminal V2 receives the second voltage signal, the second voltage signal may be transmitted to the potential raising sub-circuit 3 and the control electrode M31 of the third transistor M3 of the driving output sub-circuit 2, simultaneously. Therefore, the third transistor M3 may be controlled to be in a saturated conduction state while the potential of the reading node G is raised.

By setting the second voltage signal terminal V2 and the fourth voltage signal terminal V4 to be the same voltage signal terminal, it may be possible to simultaneously control the potential of the reading node G and the conduction state of the third transistor M3, which avoids a situation that the raising of the potential of the reading node G and the conduction of the third transistor M3 are not synchronized. Therefore, it is conductive to improving an accuracy of texture detection results.

Here, a manner in which the second voltage signal terminal V2 and the fourth voltage signal terminal V4 are set to be the same voltage signal terminal may be vary, which is determined according to actual needs.

For example, the potential raising sub-circuit 3 and the control electrode M31 of the third transistor M3 each may be electrically connected to the second voltage signal terminal V2 through a respective line. In this way, it is conductive to improving a use reliability of the texture recognition pixel circuit 100.

For another example, as shown in FIGS. 5 and 6, the potential raising sub-circuit 3 and the control electrode M31 of the third transistor M3 are electrically connected to each other, and then are electrically connected to the second voltage signal terminal V2 through a single line. In this way, it is conductive to reducing a number of lines, and then reducing an area occupied by the texture recognition pixel circuit 100.

Here, as shown in FIG. 5, considering an example where the potential raising sub-circuit 3 includes the first transistor M1, an implementation of an electrical connection between the potential raising sub-circuit 3 and the control electrode M31 of the third transistor M3 may be that, the control electrode M31 of the third transistor M3 is electrically connected to the first electrode M12 or the second electrode M13 of the first transistor M1 through a via hole. In this way, the control electrode M31 of the third transistor M3 may be electrically connected to the second voltage signal terminal V2 through the first electrode M12 or the second electrode M13 of the first transistor M1.

In some embodiments, as shown in FIGS. 3 to 6, the texture recognition pixel circuit 100 further includes: a reset sub-circuit 4.

In some examples, as shown in FIGS. 3 to 6, the reset sub-circuit 4 is electrically connected to a fifth voltage signal terminal V5, a scanning signal terminal Gate and the reading node G. The fifth voltage signal terminal V5 is configured to receive the fifth voltage signal and input the fifth voltage signal to the reset sub-circuit 4. The scanning signal terminal Gate is configured to receive a scanning signal and input the scanning signal to the reset sub-circuit 4.

In some examples, the reset sub-circuit 4 is configured to, under control of the scanning signal transmitted by the scanning signal terminal Gate, transmit the fifth voltage signal transmitted by the fifth voltage signal terminal V5 to the reading node G, so as to reset the reading node G. That is, under the control of the scanning signal, the fifth voltage signal may be transmitted to the reading node G through the reset sub-circuit 4. In this way, the fifth voltage signal is transmitted to a terminal of the photosensitive sub-circuit 1 that is electrically connected to the reading node G, a terminal of the driving output sub-circuit 2 that is electrically connected to the reading node G, and a terminal of the potential raising sub-circuit 3 that is electrically connected to the reading node G.

For example, before the photosensitive sub-circuit 1 senses the optical signal, the fifth voltage signal may be transmitted to the reading node G to reset the reading node G and provide an initial potential to the terminal of the photosensitive sub-circuit 1 that is electrically connected to the reading node G, the terminal of the driving output sub-circuit 2 that is electrically connected to the reading node G, and the terminal of the potential raising sub-circuit 3 that is electrically connected to the reading node G. In this way, it may be possible to perform noise reduction on the photosensitive sub-circuit 1, the driving output sub-circuit 2 and the potential raising sub-circuit 3, which improves accuracy of the first detection signal and the second detection signal.

A structure of the reset sub-circuit 4 may vary, which is determined according to actual needs.

In some examples, as shown in FIGS. 3 to 6, the reset sub-circuit 4 includes a fourth transistor M4. A control electrode M41 of the fourth transistor M4 (i.e., a gate of the fourth transistor M4) is electrically connected to the scanning signal terminal Gate, a first electrode M42 of the fourth transistor M4 (i.e., one of a source and a drain of the fourth transistor M4) is electrically connected to the fifth voltage signal terminal V5, and a second electrode M43 of the fourth transistor M4 (i.e., the other of the source and drain of the fourth transistor M4) is electrically connected to the reading node G.

For example, the fourth transistor M4 is configured to be turned on under the control of the scanning signal to enable the fourth transistor M4 to be in a saturated conduction state, and transmit the fifth voltage signal to the reading node G due to an action of the fifth voltage signal terminal V5 to reset the reading node G.

It will be noted that, after the reading node G is reset and before the photosensitive sub-circuit 1 senses the optical signal, the fifth voltage signal of the reading node G (i.e., a potential signal of the second terminal 112 of the photoelectric detector 11 of the photosensitive sub-circuit 1) and the first voltage signal of the first terminal 111 of the photoelectric detector 11 may cooperate with each other, so that the photoelectric detector 11 is enabled to be in the reverse bias state.

Some embodiments of the present disclosure provide a method for detecting a texture. The method for detecting a texture is applied to the texture recognition pixel circuit 100 described in any one of the above embodiments. The method for detecting the texture includes: a driving cycle including an exposure stage and an output stage.

Figure 7:
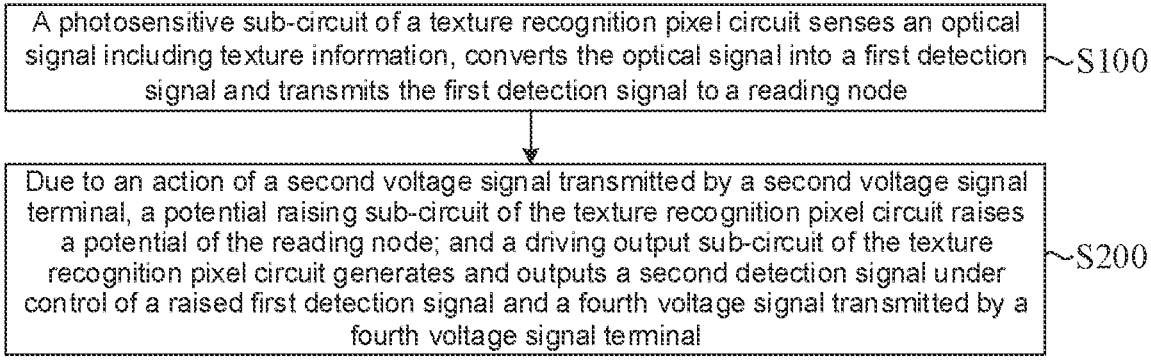
FIG. 7 is a flowchart of a method for recognizing a texture, in accordance with some embodiments of the present disclosure.

In some examples, as shown in FIG. 7, the exposure stage includes step S100.

In S100, the photosensitive sub-circuit 1 of the texture recognition pixel circuit 100 senses the optical signal including the texture information, converts the optical signal into the first detection signal and transmits the first detection signal to the reading node G.

For example, as shown in FIGS. 3 to 6, in a case where the photosensitive sub-circuit 1 includes the photoelectric detector 11, the first voltage signal terminal V1 transmits the first voltage signal to the first terminal 111 of the photoelectric detector 11. The first voltage signal cooperates with the potential of the reading node G to enable the photoelectric detector 11 to be in the reverse biased state in a case the photoelectric detector 11 does not sense the optical signal, and enable the photoelectric detector 11 to perform photoelectric conversion to convert the optical signal into the first detection signal in a case where the photoelectric detector 11 senses the optical signal.

In some examples, as shown in FIG. 7, the output stage includes step S200.

In S200, due to the action of the second voltage signal transmitted by the second voltage signal terminal V2, the potential raising sub-circuit 3 of the texture recognition pixel circuit 100 raises the potential of the reading node G; and the driving output sub-circuit 2 of the texture recognition pixel circuit 100 generates and outputs the second detection signal under the control of the raised first detection signal, the third voltage signal and the fourth voltage signal transmitted by the fourth voltage signal terminal V4.

For example, as shown in FIGS. 3 to 5, in a case where the potential raising sub-circuit 3 includes the first transistor M1, and the driving output sub-circuit 2 includes the second transistor M2 and the third transistor M3:

in a case where the second voltage signal terminal V2 transmits the second voltage signal to the first electrode M12 and the second electrode M13 of the first transistor M1, the potential of the control electrode M11 of the first transistor M1 (i.e., the potential of the reading node G) may be raised due to the action of the second voltage signal; and the second transistor M2 may be turned on (i.e., linearly turned on) under control of the raised first detection signal, the third transistor M3 may be turned on (i.e., turned on in saturation) under the control of the fourth voltage signal, the second transistor M2 generates the second detection signal according to the raised first detection signal, and the third transistor M3 outputs the second detection signal.

The beneficial effects that may be achieved by the method for detecting a texture provided in some embodiments of the present disclosure are the same as the beneficial effects that may be achieved by the texture recognition pixel circuit 100 provided in some of the above embodiments, which will not be repeated here.

In some embodiments, a driving cycle further includes a reset stage.

Figure 12:
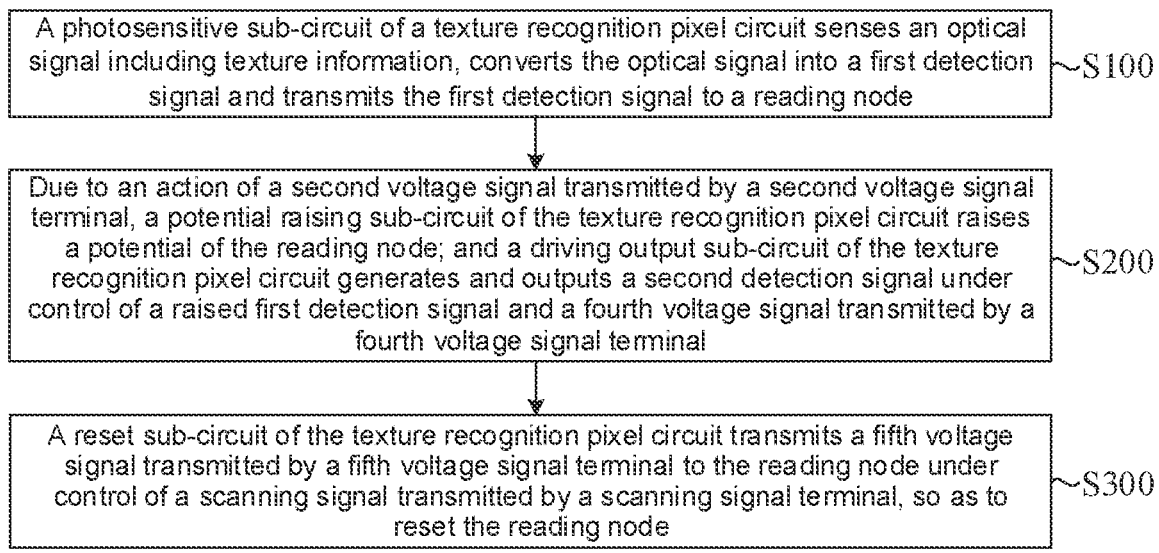
FIG. 12 is a flowchart of another method for recognizing a texture, in accordance with some embodiments of the present disclosure.

In some examples, as shown in FIG. 12, the reset stage includes step S300.

In S300, the reset sub-circuit 4 of the texture recognition pixel circuit 100 transmits the fifth voltage signal transmitted by the fifth voltage signal terminal V5 to the reading node G under the control of the scanning signal transmitted by the scanning signal terminal Gate, so as to reset the reading node G.

For example, as shown in FIGS. 3 to 6, in a case where the reset sub-circuit 4 includes the fourth transistor M4, under the control of the scanning signal, the fourth transistor M4 is turned on (i.e., turned on in saturation), and transmits the fifth voltage signal to the reading node G to reset the photosensitive sub-circuit 1, the driving output sub-circuit 2 and the potential raising sub-circuit 3 that are electrically connected to the reading node G.

Figure 8:
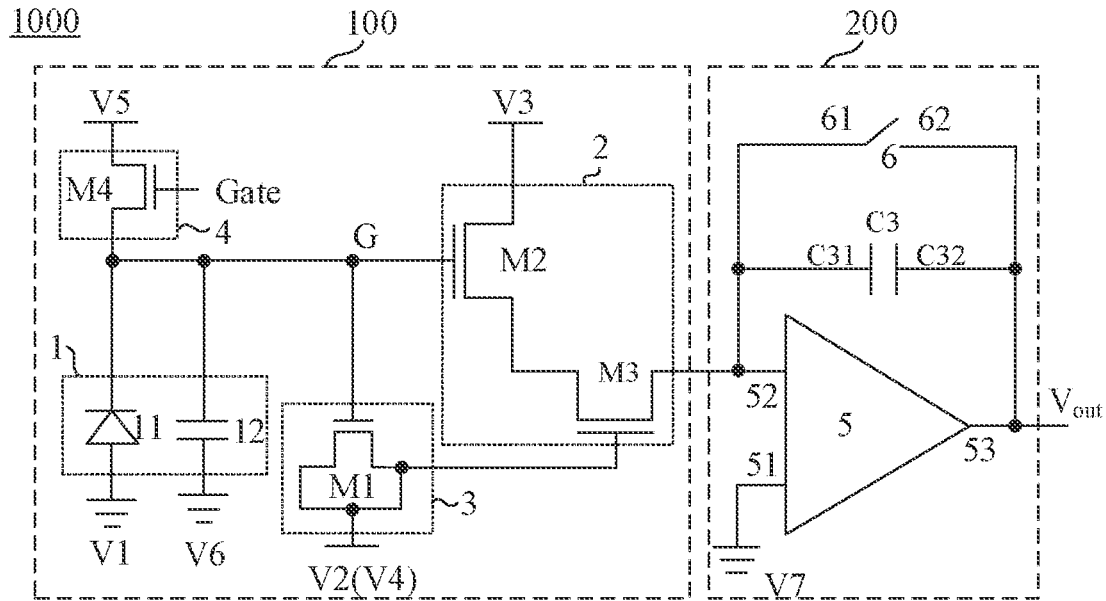
FIG. 8 is a structural diagram of a texture detection circuit, in accordance with some embodiments of the present disclosure.

Some embodiments of the present disclosure provide a texture detection circuit 1000. As shown in FIG. 8, the texture detection circuit 1000 includes a plurality of texture recognition pixel circuits 100 each as described in any one of the above embodiments and a plurality of amplification sub-circuits 200.

In some examples, as shown in FIG. 8, an amplification sub-circuit 200 is electrically connected to driving an output sub-circuit 2 of at least one texture recognition pixel circuit 100. The amplification sub-circuit 200 is configured to amplify a second detection signal output by the texture recognition pixel circuit 100.

A structure of the amplification sub-circuit 200 may vary, which is determined according to actual needs.

In some examples, as shown in FIG. 8, the amplification sub-circuit 200 includes: a negative feedback amplification circuit 5, a third storage capacitor C3 and a switch 6. A non-inverting input terminal 51 of the negative feedback amplification circuit 5 is electrically connected to a seventh voltage signal terminal V7; an inverting input terminal 52 of the negative feedback amplification circuit 5 is electrically connected to the driving output sub-circuit 2 (i.e., the second electrode M33 of the transistor M3 of the driving output sub-circuit 2), the first plate C31 of the third storage capacitor C3 and a first end 61 of the switch 6; and an output terminal 53 of the negative feedback amplification circuit 5 is electrically connected to a second plate C32 of the third storage capacitor C3 and a second end 62 of the switch 6. The seventh voltage signal terminal V7 is configured to receive a seventh voltage signal and input the seventh voltage signal to the non-inverting input terminal 51 of the negative feedback amplification circuit 5.

Here, after the seventh voltage signal is input to the non-inverting input terminal 51 of the negative feedback amplification circuit 5, the inverting input terminal 52 of the negative feedback amplification circuit 5 may output a voltage signal (i.e., the eighth voltage signal) opposite to a voltage value of the seventh voltage signal.

For example, the seventh voltage signal may be a DC voltage signal. For example, a voltage value of the first voltage signal is −1 V, and after the seventh voltage signal is input to the non-inverting input terminal 51 of the negative feedback amplification circuit 5, a voltage value of the eighth voltage signal output by the inverting input terminal 52 of the negative feedback amplification circuit 5 may be 1 V.

A working principle of the texture detection circuit 1000 will be schematically described below.

The photosensitive sub-circuit 1 of the texture recognition pixel circuit 100 senses the optical signal including texture information, converts the optical signal into the first detection signal and transmits the first detection signal to the reading node G.

Due to the action of the second voltage signal transmitted by the second voltage signal terminal V2, the potential raising sub-circuit 3 of the texture recognition pixel circuit 100 raises the potential of the reading node G.

Under the control of the fourth voltage signal transmitted by the fourth voltage signal terminal V4, the third transistor M3 of the driving output sub-circuit 2 is turned on (i.e., turned on in saturation) to transmit the voltage signal, which is output by the inverting input terminal 52 of the negative feedback amplification circuit 5, from the second electrode M33 of the third transistor M3 to the first electrode M32 of the third transistor M3, i.e., to the second electrode M23 of the second transistor M2 that is electrically connected to the first electrode M32 of the third transistor M3.

The second transistor M2 of the driving output sub-circuit 2 is turned on (linearly turned on) under the control of the raised first detection signal. In this case, a current generated in the second transistor M2 is the second detection signal. For example, a calculation formula of the current I in the second transistor M2 is:

$$I = \frac{1}{2} \times Mob \times C_{ox} \times \frac{W}{L} \times (V_{gs} - V_{th})^2,$$

where Mob represents a carrier mobility, $C_{ox}$ represents a channel capacitance per unit area of the second transistor M2, $$\frac{W}{L}$$

represents a width-to-length ratio of the channel of the second transistor M2, $V_{gs}$ represents a potential difference between the control electrode M21 and the first electrode M22 of the second transistor M2, and $V_{th}$ represents a threshold voltage of the second transistor M2. According to the formula, a value of the second detection signal may be obtained.

The second detection signal is input to the inverting input terminal 52 of the negative feedback amplification circuit 5 through the second electrode M33 of the third transistor M3. Due to an action of the negative feedback amplification circuit 5 and the third storage capacitor C3, the second detection signal is amplified; and the amplified second detection signal may be output from the output terminal 53 of the negative feedback amplifying circuit 5. During this time, the switch 6 is in an off state.

Here, in a process of amplifying the second detection signal, an electric quantity input to the amplification sub-circuit 200 and an electric quantity output from the amplification sub-circuit 200 are equal to each other. That is, I×t=C×V$_{out}$, where I represents the current generated in the second transistor M2 (i.e., a current value of the second detection signal), t represents a duration for the photosensitive sub-circuit 1 to sense light, C represents a capacitance of the third storage capacitor C3, and V$_{out}$ represents a voltage value corresponding to the amplified second detection signal. According to the formula, the amplified second detection signal may be obtained.

After the amplification sub-circuit 200 outputs the amplified second detection signal, the reading node G may be reset by the reset sub-circuit 4. During this time, the switch 6 may be turned on to input the eighth voltage signal output by the inverting input terminal 52 of the negative feedback amplification circuit 5 to the output terminal 53 of the negative feedback amplification circuit 5, so that the output terminal 53 of the negative feedback amplification circuit 5 is reset. After the reading node G and the output terminal 53 of the feedback amplification circuit 5 are reset, the switch 6 may be turned off, so as to prepare for an amplification of the second detection signal in a next stage.

Beneficial effects that may be achieved by the texture detection circuit 1000 provided in some embodiments of the present disclosure are the same as the beneficial effects achieved by the texture recognition pixel circuit 100 provided in some embodiments described above, which will not be repeated here.

A manner of connecting the plurality of amplification sub-circuits 200 to the plurality of texture recognition pixel circuits 100 may vary, which is determined according to actual needs.

In some examples, as shown in FIG. 8, each amplification sub-circuit 200 may be electrically connected to a respective texture recognition pixel circuit 100. In this way, a second detection signal output by each texture recognition pixel circuit 100 may be independently amplified, detected and recognized, which is conductive to improving the accuracy of the texture detection results.

Figure 9:
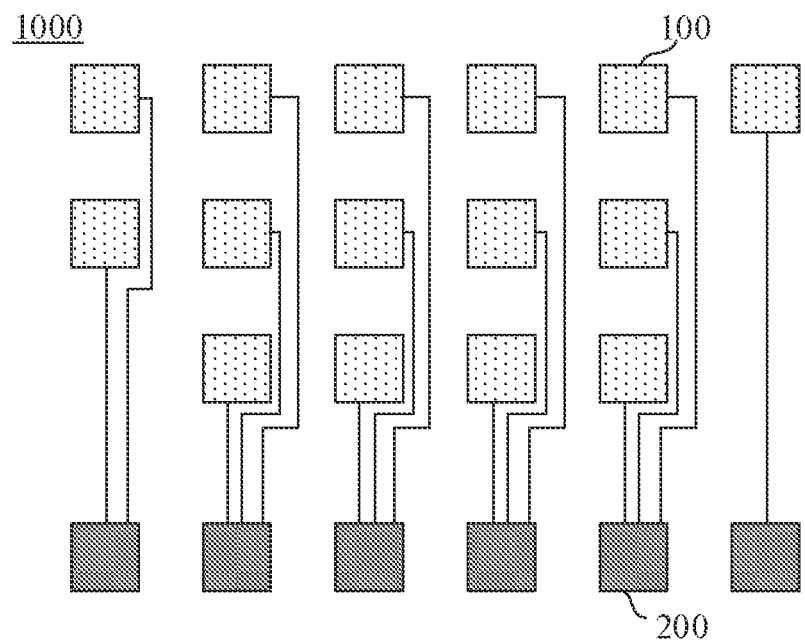
FIG. 9 is a structural diagram of another texture detection circuit, in accordance with some embodiments of the present disclosure.

In some other examples, as shown in FIG. 9, the plurality of texture recognition pixel circuits 100 are arranged in a plurality of columns, and each column of texture recognition pixel circuits 100 includes at least one texture recognition pixel circuit 100. In this case, the plurality of texture recognition pixel circuits 100 may also be arranged in a plurality of rows, and each row of texture recognition pixel circuits 100 includes at least one texture recognition pixel circuit 100.

An amplification sub-circuit 200 may be electrically connected to each texture recognition pixel circuit 100 in a single column of texture recognition pixel circuits 100. That is, a number of the amplification sub-circuits 200 is equal to a number of the columns of the plurality of texture recognition pixel circuits 100. In this way, in a process of amplifying second detection signals, a second detection signal generated by each texture recognition pixel circuit 100 in a row may be amplified first, and then second detection signals generated by texture recognition pixel circuits 100 in remaining rows may be amplified in sequence.

By electrically connecting the amplification sub-circuit 200 to the single column of texture recognition pixel circuits 100, it may be possible to reduce the number of the amplification sub-circuits 200, which is conductive to simplifying a structure of the texture detection circuit 1000 and reducing an area occupied by the texture detection circuit 1000.

Figure 10:
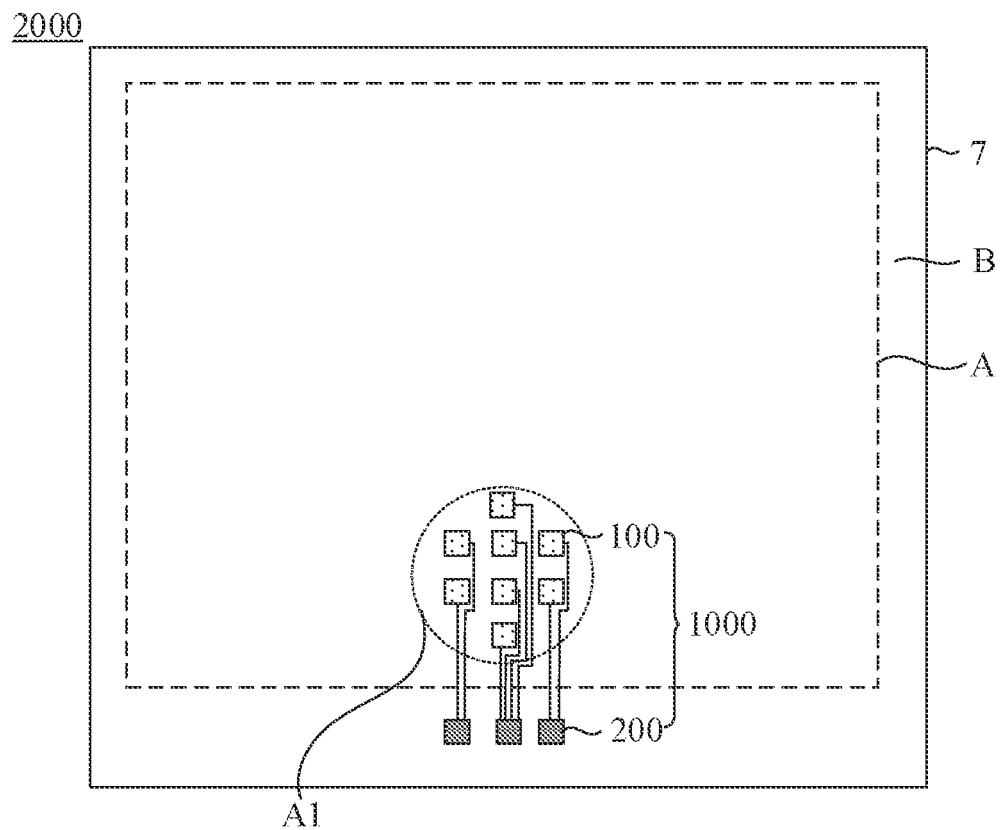
FIG. 10 is a structural diagram of a display substrate, in accordance with some embodiments of the present disclosure.

Some embodiments of the present disclosure provide a display substrate 2000. As shown in FIG. 10, the display substrate 2000 has a display region A and a non-display region B outside the display region A. For example, the non-display region B may be located on one side, on two sides or surround the display region A (as shown in FIG. 10).

In some examples, the display region A includes a texture recognition region A1. A boundary shape, a size and a position of the texture recognition region A1 may be determined according to actual needs. For example, as shown in FIG. 10, the texture recognition region A1 may be located in a middle of the display region A, and be in a shape of an ellipse or a circle.

In some examples, as shown in FIG. 10, the display substrate 2000 includes: a substrate 7 and the texture detection circuit 1000 disposed on a side of the substrate 7 according to any one of the above embodiments. The plurality of texture recognition pixel circuits 100 of the texture detection circuit 1000 are located in the texture recognition region A1, and the plurality of amplification sub-circuits 200 of the texture detection circuit 1000 are located in the non-display region B. In this way, it is conductive to reducing the area occupied by the texture detection circuit 1000 in the display area A, which avoids a reduction of a resolution of the display substrate 2000 due to an arrangement of the texture detection circuit 100.

Beneficial effects that may be achieved by the display substrate 2000 provided in some embodiments of the present disclosure are the same as the beneficial effects that may be achieved by the texture recognition pixel circuit 100 provided in some embodiments described above, which will not be repeated here.

In some embodiments, the texture recognition region A1 includes a plurality of texture recognition pixel regions. The plurality of texture recognition pixel regions may correspond to the plurality of texture recognition pixel circuits 100 in a one-to-one manner. That is, each texture recognition pixel region A is provided with a single texture recognition pixel circuit 100 therein.

In some embodiments, the display region A includes a plurality of sub-pixel regions arranged in an array. Of sub-pixel regions located in the texture recognition region A1, a texture recognition pixel region may correspond to a single sub-pixel region, or the texture recognition pixel region may correspond to at least two sub-pixel regions.

In some examples, a sub-pixel disposed in each sub-pixel region may include a light-emitting device and a pixel driving circuit configured to drive the light-emitting device to emit light. The light-emitting device may be, for example, an organic light-emitting diode (OLED) device or a quantum dot light-emitting diode (QLED) device.

In this way, in a process of detecting and recognizing a texture, light emitted by the light-emitting device may be used to irradiate a finger, and after the light is reflected by the finger, the reflected light (i.e., the optical signal including the texture information) may be detected and recognized. In this way, additional light-emitting devices may be omitted, which is conductive to simplifying a structure of the display substrate 2000.

Figure 11:
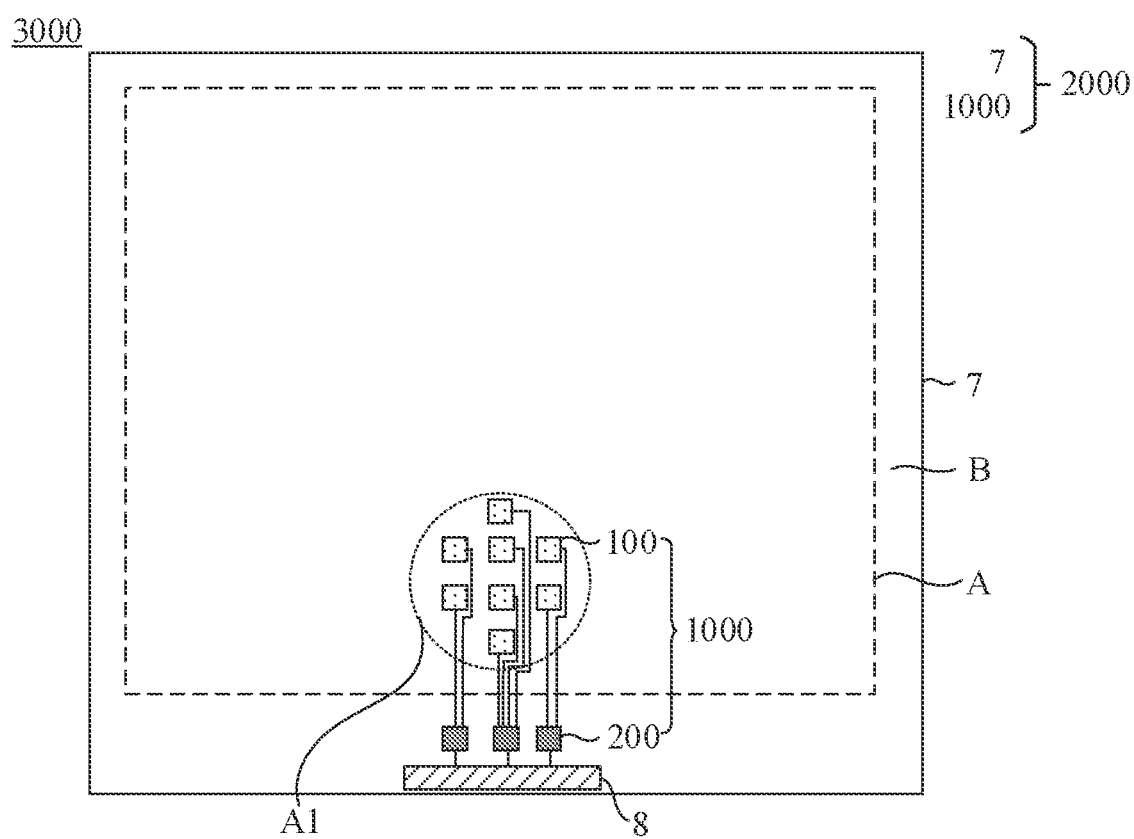
FIG. 11 is a structural diagram of a display apparatus, in accordance with some embodiments of the present disclosure.

Some embodiments of the present disclosure provide a display apparatus 3000. As shown in FIG. 11, the display apparatus 3000 includes the display substrate 2000 as described in any one of the above embodiments.

Beneficial effects that may be achieved by the display apparatus 3000 provided in some embodiments of the present disclosure are the same as the beneficial effects that may be achieved by the display substrate 2000 provided in some embodiments described above, which will not be repeated here.

In some embodiments, as shown in FIG. 11, the display apparatus 3000 further includes: a texture recognition chip 8 electrically connected to the display substrate 2000. The texture recognition chip 8 is electrically connected to the plurality of amplification sub-circuits 200 of the texture detection circuit 1000 of the display substrate 2000. The texture recognition chip 8 is configured to receive the amplified second detection signals output by the plurality of amplification sub-circuits 200, and determine a texture to be recognized according to the amplified second detection signals.

After the plurality of amplification sub-circuits 200 output the amplified second detection signals, the texture recognition chip 8 may analyze, calculate and integrate the plurality of amplified second detection signals to determine ridge or valley information corresponding to each amplified second detection signal, and then determine the texture to be recognition.

In some embodiments, the display apparatus 3000 may be a mobile phone, a tablet computer, a notebook computer, a monitor, a digital photo frame, a navigator or other products having a display function and a texture recognition function, which is not limited in the present disclosure.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A texture recognition pixel circuit, comprising: a photosensitive sub-circuit, a potential raising sub-circuit and a driving output sub-circuit, wherein the photosensitive sub-circuit is electrically connected to a first voltage signal terminal and a reading node; and the photosensitive sub-circuit is configured to, under control of a first voltage transmitted by the first voltage terminal and a potential of the reading node, sense an optical signal including texture information, convert the optical signal into a first detection signal, and transmit the first detection signal to the reading node;

the potential raising sub-circuit is electrically connected to a second voltage signal terminal and the reading node; and the potential raising sub-circuit is configured to, due to an action of a second voltage signal transmitted by the second voltage signal terminal, raise the potential of the reading node;

the driving output sub-circuit is electrically connected to a third voltage signal terminal, a fourth voltage signal terminal and the reading node; and the driving output sub-circuit is configured to, due to an action of the raised first detection signal, a third voltage signal transmitted by the third voltage signal terminal and a fourth voltage signal transmitted by the fourth voltage signal terminal, generate and output a second detection signal; and the second voltage signal terminal and the fourth voltage signal terminal are a same voltage signal terminal.

2. The texture recognition pixel circuit according to claim 1, wherein the potential raising sub-circuit includes a first transistor;

a control electrode of the first transistor is electrically connected to the reading node, and a first electrode and a second electrode of the first transistor are both electrically connected to the second voltage signal terminal.

3. The texture recognition pixel circuit according to claim 1, wherein the potential raising sub-circuit includes a first storage capacitor;

a first plate of the first storage capacitor is electrically connected to the reading node, and a second plate of the first storage capacitor is electrically connected to the second voltage signal terminal.

4. The texture recognition pixel circuit according to claim 1, wherein the photosensitive sub-circuit includes a photoelectric detector; a first terminal of the photoelectric detector is electrically connected to the first voltage signal terminal, and a second terminal of the photoelectric detector is electrically connected to the reading node; and the driving output sub-circuit includes a second transistor and a third transistor; a control electrode of the second transistor is electrically connected to the reading node, and a first electrode of the second transistor is electrically connected to the third voltage signal terminal, and a second electrode of the second transistor is electrically connected to a first electrode of the third transistor; and a control electrode of the third transistor is electrically connected to the fourth voltage signal terminal, and a second electrode of the third transistor is configured to output the second detection signal.

5. The texture recognition pixel circuit according to claim 1, further comprising: a reset sub-circuit, wherein the reset sub-circuit is electrically connected to a fifth voltage signal terminal, a scanning signal terminal and the reading node; and the reset sub-circuit is configured to, under control of a scanning signal transmitted by the scanning signal terminal, transmit a fifth voltage signal transmitted by the fifth voltage signal terminal to the reading node, so as to reset the reading node.

6. The texture recognition pixel circuit according to claim 5, wherein the reset sub-circuit includes a fourth transistor;

a control electrode of the fourth transistor is electrically connected to the scanning signal terminal, a first electrode of the fourth transistor is electrically connected to the fifth voltage signal terminal, and a second electrode of the fourth transistor is electrically connected to the reading node.

7. A texture recognition pixel circuit comprising: a photosensitive sub-circuit, a potential raising sub-circuit, a driving output sub-circuit and a second storage capacitor, wherein the photosensitive sub-circuit is electrically connected to a first voltage signal terminal and a reading node; and the photosensitive sub-circuit is configured to, under control of a first voltage transmitted by the first voltage terminal and a potential of the reading node, sense an optical signal including texture information, convert the optical signal into a first detection signal, and transmit the first detection signal to the reading node;

the potential raising sub-circuit is electrically connected to a second voltage signal terminal and the reading node; and the potential raising sub-circuit is configured to, due to an action of a second voltage signal transmitted by the second voltage signal terminal, raise the potential of the reading node;

the driving output sub-circuit is electrically connected to a third voltage signal terminal, a fourth voltage signal terminal and the reading node; and the driving output sub-circuit is configured to, due to an action of the raised first detection signal, a third voltage signal transmitted by the third voltage signal terminal and a fourth voltage signal transmitted by the fourth voltage signal terminal, generate and output a second detection signal; and a first plate of the second storage capacitor is electrically connected to a sixth voltage signal terminal, and a second plate of the second storage capacitor is electrically connected to the reading node, a signal transmitted by the sixth voltage signal terminal is different from the first detection signal on the reading node; and the second storage capacitor is configured to store the first detection signal transmitted to the reading node.

8. A method for detecting a texture, which is applied to the texture recognition pixel circuit according to claim 1, a driving cycle of the method including an exposure stage and an output stage, the method comprising:

in the exposure stage:
sensing, by the photosensitive sub-circuit of the texture recognition pixel circuit under the control of the first voltage transmitted by the first voltage terminal and the potential of the reading node, the optical signal including the texture information; converting, by the photosensitive sub-circuit of the texture recognition pixel circuit, the optical signal into the first detection signal; and transmitting, by the photosensitive sub-circuit of the texture recognition pixel circuit, the first detection signal to the reading node; and in the output stage:
raising, by the potential raising sub-circuit of the texture recognition pixel circuit, the potential of the reading node due to the action of the second voltage signal transmitted by the second voltage signal terminal; and
generating, by the driving output sub-circuit of the texture recognition circuit, the second detection signal under the control of the first raised detection signal, the third voltage signal transmitted by the third voltage signal terminal and the fourth voltage signal transmitted by the fourth voltage signal terminal, and outputting, by the driving output sub-circuit, the second detection signal.

9. A texture detection circuit, comprising: a plurality of texture recognition pixel circuits each according to claim 1 and a plurality of amplification sub-circuits, wherein an amplification sub-circuit of the plurality of amplification sub-circuits is electrically connected with a driving output sub-circuit of at least one texture recognition pixel circuit of the plurality of texture recognition pixel circuits; and the amplification sub-circuit is configured to amplify a second detection signal output by the driving output sub-circuit.

10. The texture detection circuit according to claim 9, wherein the amplification sub-circuit includes: a negative feedback amplification circuit, a third storage capacitor and a switch;
a non-inverting input terminal of the negative feedback amplification circuit is electrically connected to a seventh voltage signal terminal, an inverting input terminal of the negative feedback amplification circuit is electrically connected to the driving output sub-circuit, a first plate of the third storage capacitor and a first end of the switch, and an output terminal of the negative feedback amplification circuit is electrically connected to a second plate of the third storage capacitor and a second end of the switch.

11. The texture detection circuit according to claim 9, wherein the plurality of texture recognition pixel circuits are arranged in a plurality of columns; a column of texture recognition pixel circuits includes at least one texture recognition pixel circuit; and
the amplification sub-circuit is electrically connected to each texture recognition pixel circuit in the column of texture recognition pixel circuits.

12. A display substrate, having a display region and a non-display region outside the display region; the display region including a texture recognition region, wherein the display substrate comprises:
a substrate; and
the texture detection circuit according to claim 10 disposed on a side of the substrate, wherein
the plurality of texture recognition pixel circuits of the texture detection circuit are located in the texture recognition region, and the plurality of amplification sub-circuits of the texture detection circuit are located in the non-display region.

13. A display apparatus, comprising the display substrate according to claim 12.

14. The display apparatus according to claim 13, further comprising:
a texture recognition chip electrically connected to the plurality of amplification sub-circuits of the texture detection circuit of the display substrate, wherein the texture recognition chip is configured to receive amplified second detection signals output by the plurality of amplification sub-circuits, and determine a texture to be recognized according to the amplified second detection signals.

15. A texture recognition pixel circuit comprising: a photosensitive sub-circuit, a potential raising sub-circuit, a driving output sub-circuit and a second storage capacitor; wherein
the photosensitive sub-circuit is electrically connected to a first voltage signal terminal and a reading node: and the photosensitive sub-circuit is configured to, under control of a first voltage transmitted by the first voltage terminal and a potential of the reading node, sense an optical signal including texture information, convert the optical signal into a first detection signal, and transmit the first detection signal to the reading node;
the potential raising sub-circuit is electrically connected to a second voltage signal terminal and the reading node; and the potential raising sub-circuit is configured to, due to an action of a second voltage signal transmitted by the second voltage signal terminal, raise the potential of the reading node;
the driving output sub-circuit is electrically connected to a third voltage signal terminal, a fourth voltage signal terminal and the reading node; and the driving output sub-circuit is configured to, due to an action of the raised first detection signal, a third voltage signal transmitted by the third voltage signal terminal and a fourth voltage signal transmitted by the fourth voltage signal terminal, generate and output a second detection signal;
a first plate of the second storage capacitor is electrically connected to a sixth voltage signal terminal, and a second plate of the second storage capacitor is electrically connected to the reading node;
the photosensitive sub-circuit includes a photoelectric detector; the potential raising sub-circuit includes a first transistor; the driving output sub-circuit includes a second transistor and a third transistor; and the reset sub-circuit includes a fourth transistor;
a first terminal of the photoelectric detector is electrically connected to the first voltage signal terminal, and a second terminal of the photoelectric detector is electrically connected to the reading node;
a control electrode of the first transistor is electrically connected to the reading node, and a first electrode and a second electrode of the first transistor are both electrically connected to the second voltage signal terminal;
a control electrode of the second transistor is electrically connected to the reading node, and a first electrode of the second transistor is electrically connected to the third voltage signal terminal, and a second electrode of the second transistor is electrically connected to a first electrode of the third transistor,
a control electrode of the third transistor is electrically connected to the fourth voltage signal terminal, and a second electrode of the third transistor is configured to output the second detection signal; and
a control electrode of the fourth transistor is electrically connected to the scanning signal terminal, a first electrode of the fourth transistor is electrically connected to a fifth voltage signal terminal, and a second electrode of the fourth transistor is electrically connected to the reading node.

16. The texture recognition pixel circuit according to claim 1, further comprising: a second storage capacitor;
a first plate of the second storage capacitor is electrically connected to a sixth voltage signal terminal, and a second plate of the second storage capacitor is electrically connected to the reading node;
the photosensitive sub-circuit includes a photoelectric detector; the potential raising sub-circuit includes a first storage capacitor; the driving output sub-circuit includes a second transistor and a third transistor; and the reset sub-circuit includes a fourth transistor;
a first terminal of the photoelectric detector is electrically connected to the first voltage signal terminal, and a second terminal of the photoelectric detector is electrically connected to the reading node;
a first plate of the first storage capacitor is electrically connected to the reading node, and a second plate of the first storage capacitor is electrically connected to the second voltage signal terminal;
a control electrode of the second transistor is electrically connected to the reading node, and a first electrode of the second transistor is electrically connected to the third voltage signal terminal, and a second electrode of the second transistor is electrically connected to a first electrode of the third transistor;

a control electrode of the third transistor is electrically connected to the fourth voltage signal terminal, and a second electrode of the third transistor is configured to output the second detection signal; and a control electrode of the fourth transistor is electrically connected to the scanning signal terminal, a first electrode of the fourth transistor is electrically connected to a fifth voltage signal terminal, and a second electrode of the fourth transistor is electrically connected to the reading node.

17. The method according to claim 8, wherein in a reset stage:

transmitting, by the reset sub-circuit of the texture recognition pixel circuit, a fifth voltage signal transmitted by a fifth voltage signal terminal to the reading node under control of a scanning signal transmitted by the scanning signal terminal, so as to reset the reading node.

18. The texture detection circuit according to claim 9, wherein the plurality of amplification sub-circuits are electrically connected to the plurality of texture recognition pixel circuits in one-to-one correspondence.

* * * * *

UNITED STATES PATENT AND TRADEMARK OFFICE
CERTIFICATE OF CORRECTION

PATENT NO. : 12,361,746 B2
APPLICATION NO. : 17/911333
DATED : July 15, 2025
INVENTOR(S) : Yingming Liu, Xiaoliang Ding and Lei Wang Page 1 of 1

It is certified that error appears in the above-identified patent and that said Letters Patent is hereby corrected as shown below:

In the Claims

Column 23, Line 31, Claim 12, "the texture detection circuit according to claim 10" should read -- the texture detection circuit according to claim 9 --.

Signed and Sealed this
Twenty-third Day of December, 2025

John A. Squires
*Director of the United States Patent and Trademark Office*